(12) United States Patent
Okamoto et al.

(10) Patent No.: US 11,515,747 B2
(45) Date of Patent: Nov. 29, 2022

(54) MOTOR AND ELECTRIC POWER STEERING DEVICE

(71) Applicant: Nidec Corporation, Kyoto (JP)

(72) Inventors: Toshiya Okamoto, Kyoto (JP); Takashi Hattori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 188 days.

(21) Appl. No.: 16/967,758

(22) PCT Filed: Jan. 25, 2019

(86) PCT No.: PCT/JP2019/002513
§ 371 (c)(1),
(2) Date: Aug. 6, 2020

(87) PCT Pub. No.: WO2019/155917
PCT Pub. Date: Aug. 15, 2019

(65) Prior Publication Data
US 2021/0044170 A1  Feb. 11, 2021

(30) Foreign Application Priority Data
Feb. 7, 2018  (JP) .............................. JP2018-019996

(51) Int. Cl.
*H02K 11/33* (2016.01)
*H02K 3/50* (2006.01)
(Continued)

(52) U.S. Cl.
CPC ............. *H02K 3/50* (2013.01); *H02K 5/1732* (2013.01); *H02K 5/225* (2013.01); *H02K 7/083* (2013.01);
(Continued)

(58) Field of Classification Search
CPC ........ H02K 5/225; H02K 5/1732; H02K 9/22; H02K 3/50; H02K 3/522; H02K 11/33; H02K 7/083; H02K 2203/09
See application file for complete search history.

(56) References Cited

U.S. PATENT DOCUMENTS 7,652,402 B2 *  1/2010  Kinoshita ................ H02K 5/20
310/55
9,960,653 B2 *  5/2018  Takeuchi ................. H02K 5/04
(Continued)

FOREIGN PATENT DOCUMENTS

JP       2007-247675 A      9/2007

OTHER PUBLICATIONS

Official Communication issued in International Patent Application No. PCT/JP2019/002513, dated Apr. 23, 2019.

*Primary Examiner* — Dang D Le
(74) *Attorney, Agent, or Firm* — Keating & Bennett

(57) ABSTRACT

A motor includes a rotor including a shaft extending in an axial direction, a stator surrounding a radially outer portion of the rotor, a support into which the conductor is inserted, the support being made of an insulating material, and a holder including through holes to hold the support, in which the support includes the first and second protuberances at least a portion of which is located in the through hole, the first and second protuberances being provided at intervals, and a base portion connecting the first and second, protuberances, and in which at least a portion of each of facing regions of a side surface of the first protuberance is close to the holder, and the second protuberance has a clearance with respect to the holder.

10 Claims, 13 Drawing Sheets

(51) Int. Cl.
*H02K 5/173* (2006.01)
*H02K 5/22* (2006.01)
*H02K 7/08* (2006.01)
*H02K 9/22* (2006.01)
*B62D 5/04* (2006.01)

(52) U.S. Cl.
CPC ............ *H02K 9/22* (2013.01); *B62D 5/0409* (2013.01); *H02K 2203/09* (2013.01)

(56) References Cited

U.S. PATENT DOCUMENTS

| | | |
|---|---|---|
| 2015/0222156 A1* | 8/2015 | Tomizawa ............... H02K 5/10 310/88 |
| 2016/0181885 A1 | 6/2016 | Yamasaki |
| 2019/0267862 A1 | 8/2019 | Hattori et al. |
| 2019/0273416 A1 | 9/2019 | Kizu et al. |
| 2019/0280566 A1 | 9/2019 | Hattori et al. |
| 2019/0280567 A1 | 9/2019 | Hattori et al. |
| 2019/0283798 A1 | 9/2019 | Hattori et al. |
| 2019/0319516 A1 | 10/2019 | Kizu et al. |
| 2019/0319517 A1 | 10/2019 | Hattori et al. |
| 2019/0348885 A1 | 11/2019 | Hattori et al. |
| 2020/0059141 A1 | 2/2020 | Okamoto et al. |
| 2020/0062295 A1 | 2/2020 | Hattori et al. |

* cited by examiner

MOTOR AND ELECTRIC POWER STEERING DEVICE

CROSS REFERENCE TO RELATED APPLICATIONS

This is a U.S. national stage of PCT Application No. PCT/JP2019/002513, filed on Jan. 25, 2019, and priority under 35 U.S.C. § 119(a) and 35 U.S.C. § 365(b) is claimed from Japanese Application No. 2018-019996, filed Feb. 7, 2018; the entire disclosures of which are hereby incorporated herein by reference.

1. FIELD OF THE INVENTION

The present disclosure relates to a motor and an electric power steering device.

2. BACKGROUND

There is known a structure in which a support member is provided to support a coil wire drawn out from a motor. For example, there is a structure in which after supporting the lead wire of the stator coil through the through hole of the seal member, the lead wire and the seal member are inserted into the through hole of the fixing member, and a fixing member is combined with a case.

In the structure described above, when inserting the seal member into the through hole of the fixing member, the dimensions of the through hole and the support member require high accuracy. In order to attach the seal member to the fixing member, it is necessary to control the dimensions of the seal member and the fixing member with high accuracy.

SUMMARY

In one aspect of an example embodiment according to the present disclosure, a motor includes a rotor including a shaft extending in an axial direction, a stator surrounding a radially outer portion of the rotor, a support into which a conductor is inserted, the support being made of an insulating material, and a holder including a plurality of through holes to hold the support, in which the support includes a first protuberance and a second protuberance at least a portion of which is located in the through hole, the first protuberance and the second protuberance being provided at intervals, and a base portion connecting the first protuberance and the second protuberance, and in which at least a portion of each of facing regions of a side surface of the first protuberance is close to the holder, and the second protuberance has a clearance with respect to the holder.

The above and other elements, features, steps, characteristics and advantages of the present disclosure will become more apparent from the following detailed description of the example embodiments with reference to the attached drawings.

DETAILED DESCRIPTION

Figure 1:
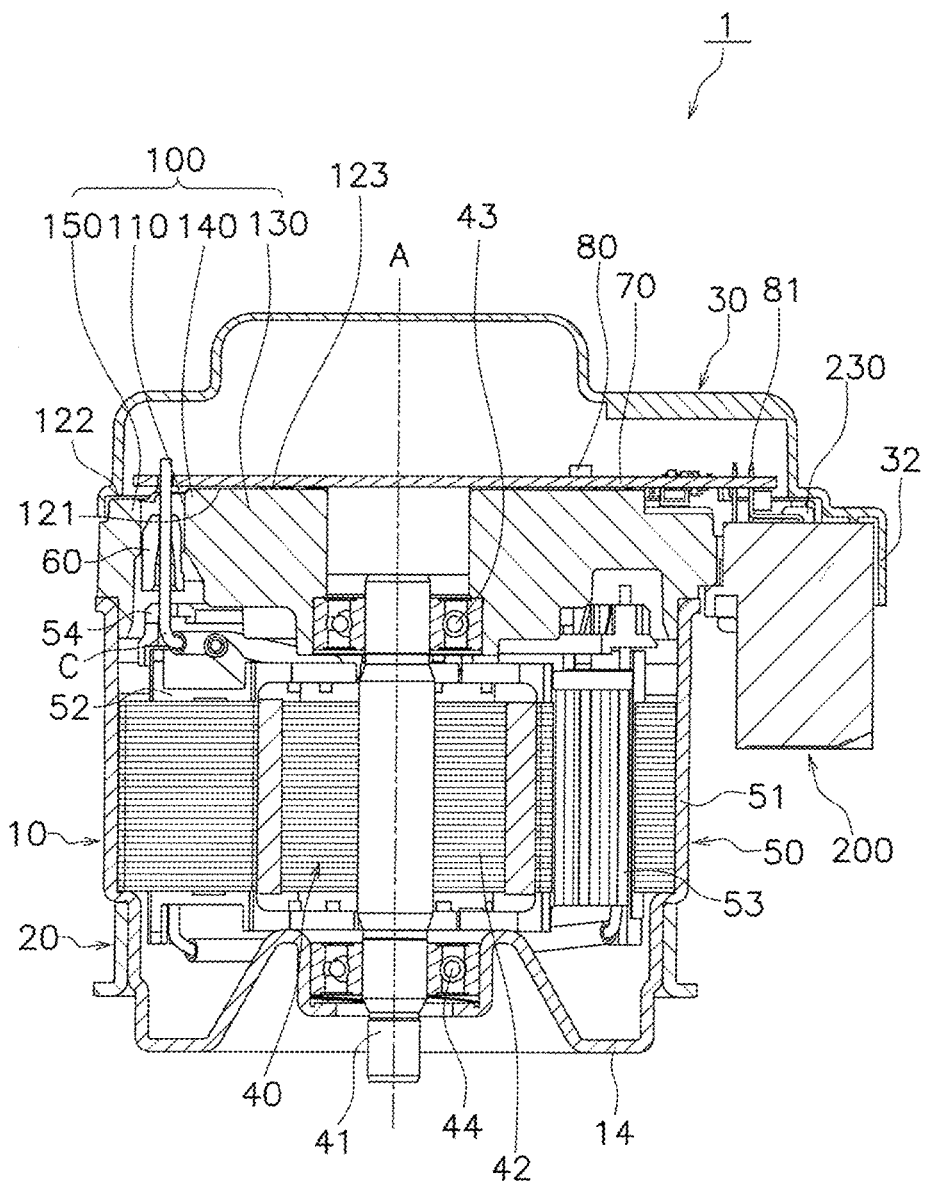
FIG. 1 is a cross-sectional view of a motor according to a first example embodiment of the present disclosure.

Hereinafter, example embodiments of the present disclosure will be described with reference to the drawings. In the following drawings, the same or corresponding parts are denoted by the same reference numerals, and description thereof will not be repeated.

In the following explanation, as shown in FIG. 1, a center axis A of a rotor, that is, an axial direction in which a shaft extends is a vertical direction, and a board side is an upper side, a bottom side of a housing is a lower side. However, the vertical direction in this specification is for use in specifying the positional relationship, and does not limit the actual direction. That is, a downward direction does not necessarily mean the direction of gravity.

The direction orthogonal to the center axis A of the rotor is a radial direction, and the radial direction is centered on the center axis A. A circumferential direction is a direction around the center axis A of the rotor.

The term "extending in the axial direction" in the present specification refers to a state of strictly extending in the axial direction and a state of extending in a direction inclined at less than 45 degrees with respect to the axial direction. Similarly, the term "extending in the radial direction" in the present specification refers to a state of extending in the radial direction strictly and a state of extending in a direction inclined at less than 45 degrees with respect to the radial direction.

Further, in this specification, the term "fitting" means fitting components in fitted shape. The "fitted shape"

includes a state where the shape is the same, a state where the shape is similar, and a state where the shapes are different. In the case where the fitted shape is a projection-recess shape, at least part of the projection is located in the recess.

Further, in the present specification, the term "gap" means that the members are separated so that they do not touch each other, and the distance between the members is not particularly limited.

A motor according to an example embodiment of the present disclosure will be described with reference to FIGS. 1 to 16. The motor according to the first example embodiment has a two-system configuration having two sets of the U-phase, the V-phase, and the W-phase.

As shown in FIG. 1, a motor 1 mainly includes a housing 10, a flange 20, a cover 30, a rotor 40, bearings 43 and 44, a stator 50, a coil support member 60, a control unit including a board 70 and an electronic component 80, a heat sink 100, and a connector 200.

The housing 10 accommodates the rotor 40, the stator 50, and the bearings 43 and 44 therein. The housing 10 extends in the axial direction and opens upward. The housing 10 includes a bottom portion 14. The bottom portion 14 closes the housing 10.

The flange 20 is attached to the outer face of the housing 10.

The cover 30 covers at least part of the upper parts of the board 70 and the connector 200 in the axial direction.

A rotor 40 includes a shaft 41 and a rotor core 42. The shaft 41 has a substantially cylindrical shape with the center axis A, as the center, extending in the axial direction. The rotor core 42 is fixed to the shaft 41. The rotor core 42 surrounds the radially outer part of the shaft. The rotor core 42 rotates together with the shaft 41.

The bearings 43 and 44 rotatably support the shaft 41. The bearing 43 disposed on the axially upper side is located axially above the stator 50 and is held by the heat sink 100. The bearing 44 disposed axially below the stator 50 is held by the bottom portion 14 of the housing 10.

The stator 50 surrounds the radially outer part of the rotor 40. Stator 50 includes a stator core 51, an insulator 52, a coil 53, a bus bar B (see FIG. 3), and a bus bar holding member 54.

Figure 2:
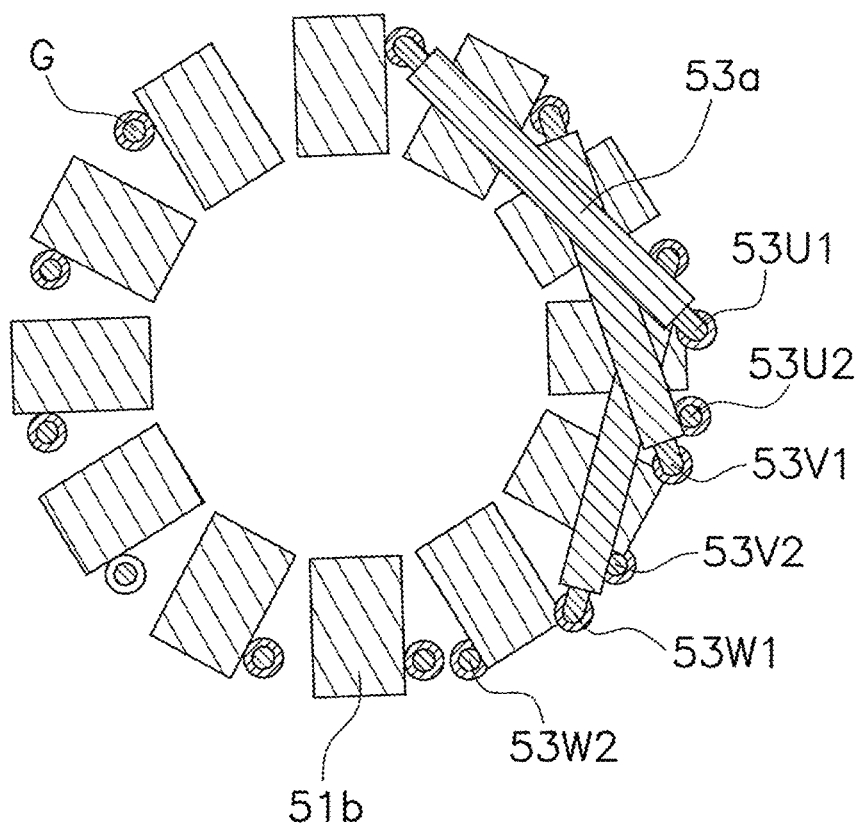
FIG. 2 is a schematic diagram of a stator according to the first example embodiment of the present disclosure.

As shown in FIG. 2, the stator core 51 has a plurality of core backs and teeth 51b disposed in the circumferential direction. The core back has a tubular shape concentric with the center axis A. The teeth 51b extend radially inward from the inner face of the core back. A plurality of teeth 51b is provided, extends in the radial direction from the core back, and is disposed with a gap (slot) therebetween in the circumferential direction.

As shown in FIG. 1, the insulator 52 covers at least a portion of the stator core 51. The insulator 52 is formed of an insulator and is attached to each tooth 51b.

The coil 53 excites the stator core 51 and is configured by winding a coil wire C. Specifically, the coil wire C is wound around each tooth 51b via the insulator 52, and the coil 53 is disposed on each tooth 51b. That is, the coil wire C is concentrically wound. In the present example embodiment, the coil wire C is wound around each of two different teeth 51b in a concentrated manner, so-called two teeth in winding. The coil wire C is located radially inside relative to the radially outer end of the bus bar holding member 54.

One end of the coil wire C is connected to the bus bar B. The other end of the coil wire C is inserted into the coil support member 60 described later and connected to the board 70. The other end of the coil wire C of the present example embodiment is a conducting wire drawn out of the coil 53, and, specifically, as shown in FIG. 2, six lead wires 53U1, 53U2, 53V1, 53V2, 53W1, and 53W2 constituting each of the U-phase, the V-phase, and the W-phase in the first and second systems. The lead wires 53U1, 53U2, 53V1, 53V2, 53W1, and 53W2 drawn from the stator 50 are inserted into a through hole 65 (see FIG. 4) of the coil support member 60 described later and a heat sink through hole 110 (see FIG. 7), and are electrically connected to the control unit by a method such as soldering.

The lead wires 53U1, 53U2, 53V1, 53V2, 53W1, and 53W2 are collected in a region of 180 degrees or less around the shaft by a crossover wire 53a.

When the motor 1 is driven, the current is passed through the lead wires 53U1, 53V1, and 53W1 constituting the respective layers of the U-phase, the V-phase, and the W phase in the first system, and the current is also passed through the lead wires 53U2, 53V2, and 53W2 constituting the respective phases of the U-phase, the V-phase, and the W-phase phases in the second system. With this configuration, for example, even when the electricity to the coil to one system is stopped due to an inverter failure, etc., when the motor 1 is driven, since the coil in the other system can be energized, so that the motor 1 can be driven.

Although the motor 1 in the present example embodiment has a two-system configuration including two sets of the U-phase, the V-phase, and the W-phase, the number of systems can be arbitrarily designed. That is, the motor 1 may have a single system, or three or more systems.

The bus bar B is a member formed of a conductive material that electrically connects the coil wires led out from the coil 53 to each other. The bus bar B in the present example embodiment is a neutral point bus bar in star connection.

Figure 3:
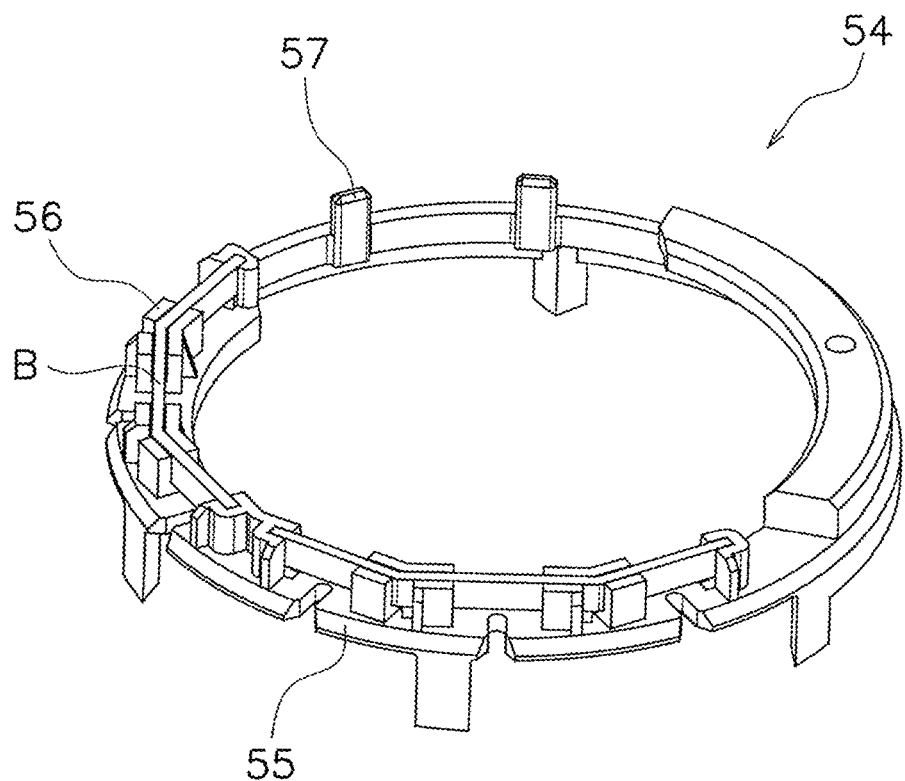
FIG. 3 is a perspective view of a bus bar holding member according to the first example embodiment of the present disclosure.

The bus bar holding member 54 shown in FIG. 3 holds the bus bar B. The bus bar holding member 54 is made of an insulating material. As shown in FIG. 1, the bus bar holding member 54 is fixed to the radially outer part of the insulator 52 or the axially upper part of the core back. The bus bar holding member 54 and the bearing 43 overlap in the radial direction.

As shown in FIG. 3, the bus bar holding member 54 has a ring-shaped base portion 55, a holding portion 56 that holds the bus bar B, and a bus bar projection 57. The bus bar projection 57 and the holding portion 56 extend axially upward from part of the base portion 55 and are provided at different positions in the circumferential direction.

The stator 50 has a stator fitting portion which is a projection or a recess extending in the axial direction. In the present example embodiment, the stator fitting portion is the bus bar projection 57 formed in the bus bar holding member and extending in the axial direction. Note that the stator fitting portion may be a recess (not shown) formed in the bus bar holding member 54 and recessed axially downward. Further, the stator fitting portion may be a projection or a recess formed at the upper end of the stator core 51, the insulator 52, or the like.

As shown in FIG. 1, the coil support member 60 supports a conductive member such as the coil wire C. The coil support member 60 is made of an insulating material. The coil support member 60 is disposed axially above the stator 50, and the coil wire C is inserted therethrough.

Figure 4:
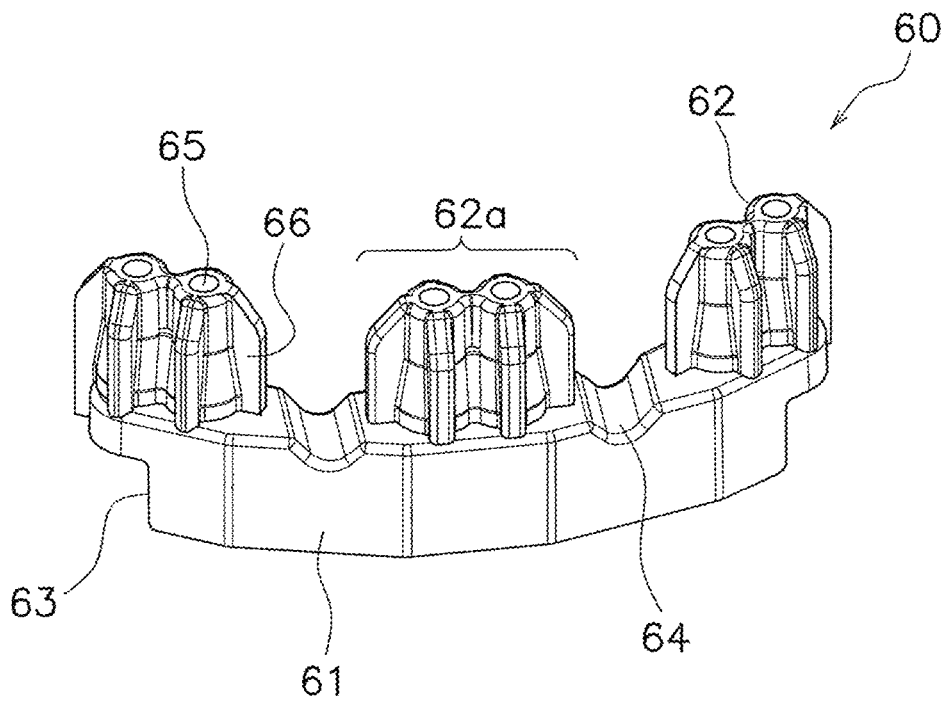
FIG. 4 is a perspective view of a coil support member according to the first example embodiment of the present disclosure.

As shown in FIG. 4, the coil support member 60 includes a base portion 61 and a coil support portion 62 extending axially upward from the base portion 61.

The base portion 61 is disposed on the upper face of the stator 50. At least part of the base portion 61 and the stator 50 contact at least partially each other in the axial direction. There may be a partial clearance between the base portion 61 and the stator 50.

Figure 5:
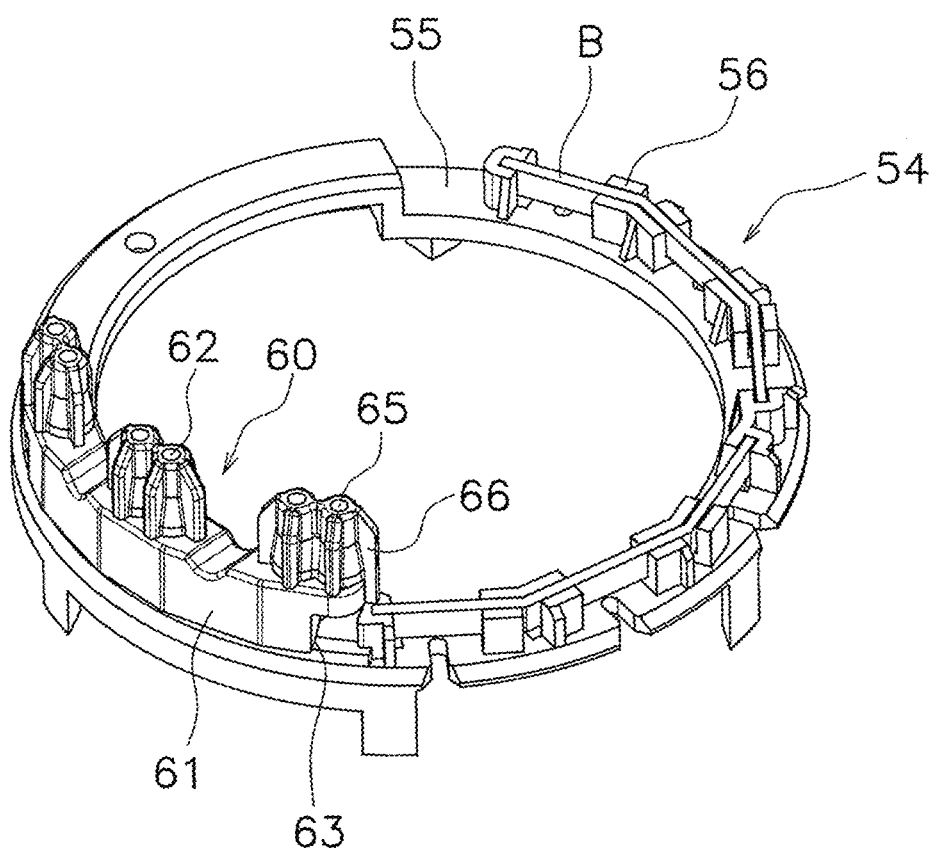
FIG. 5 is a perspective view of the bus bar holding member and the coil support member according to the first example embodiment of the present disclosure.
Figure 6:
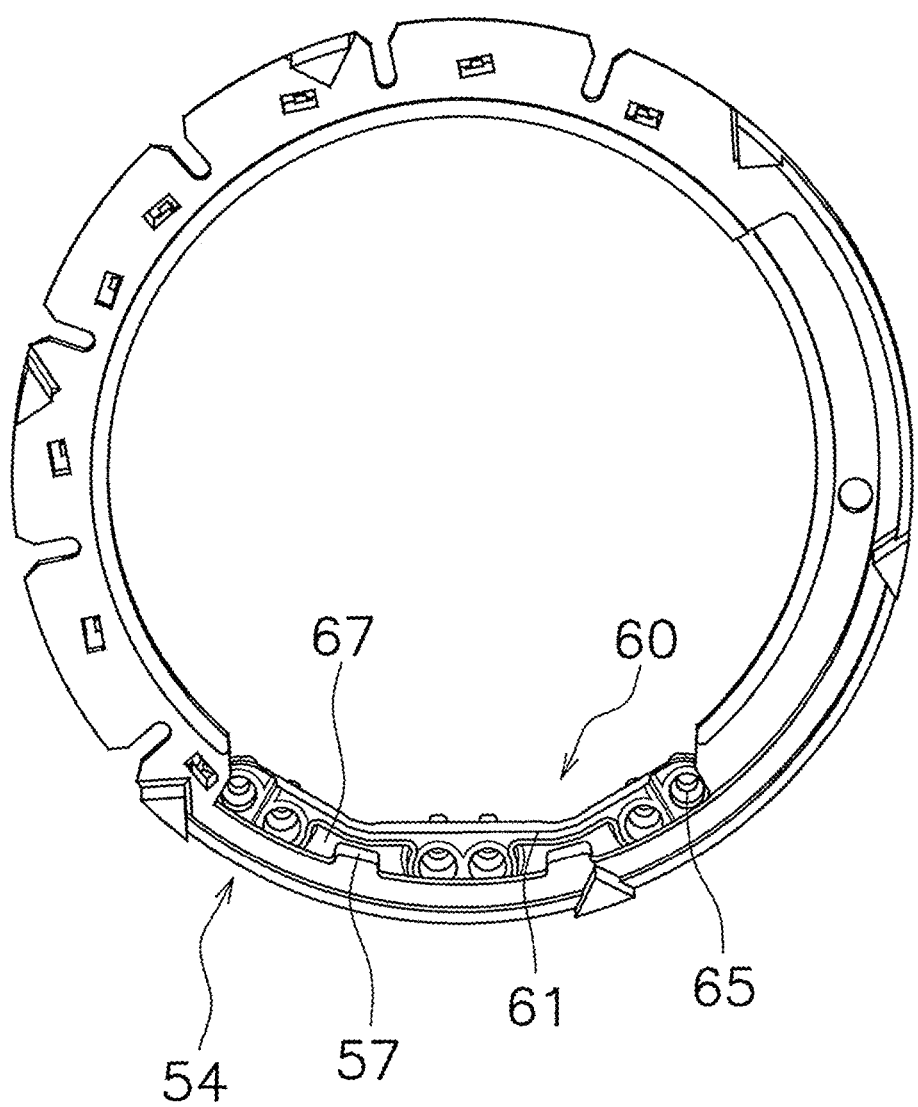
FIG. 6 is a bottom view of the bus bar holding member and the coil support member according to the first example embodiment of the present disclosure.

In the present example embodiment, the stator fitting portion is formed in the bus bar holding member 54. Therefore, as shown in FIGS. 5 and 6, the base portion 61 is located on the upper face of the bus bar holding member 54. When the stator fitting portion is formed in the stator core 51, the base portion 61 is located on the upper face of the stator core 51, and when the stator fitting portion is formed in the insulator 52, the base portion 61 is located on the upper face of the insulator 52.

As shown in FIGS. 4 and 5, a cut 63 is formed on the axially lower part and at the circumferentially both ends of the base portion 61. The cut 63 is cut out from the lower face toward the upper side in the axial direction at the circumferentially both ends.

The base portion 61 has a groove 64 formed at the upper end and extending in the radial direction. The groove 64 is located axially above the upper end face of the housing 10.

The radially outer faces of the base portion 61 are formed by a plurality of faces. In the present example embodiment, the number of the radially outer faces of the base portion 61 is five. Note that the radially outer face of the base portion 61 may be a curved surface or the like.

The coil support portion 62 has the through hole 65 through which the coil wire is inserted. The coil wires of the present example embodiment are the six lead wires 53U1, 53U2, 53V1, 53V2, 53W1, and 53W2 constituting the U-phase, the V-phase, and W phase in each of the first and second systems. Since one lead wire is held by one through hole 65, six coil support portions 62 each having the through hole 65 are provided on the base portion 61. In the present example embodiment, the coil support portions 62 through which the coil wires of the same phase are inserted are adjacent to each other without a gap to form a protuberance 62a. That is, the protuberance 62a has a portion that forms the through hole 65 through which a coil wire of the same phase is inserted, and a rib 66 described later. Specifically, the protuberance 62a has the two coil support portions 62 and the six ribs 66. The protuberances 62a are present for the U-phase, the V-phase, and the W-phase, and their number is therefore three. Each protuberance 62a is disposed side by side at intervals.

At least part of the coil support portion 62 is located in the heat sink through hole 110 described later. The width of the coil support portion 62 shown in FIG. 4 is equal to the width of the heat sink through hole 110 from the upper side to the lower side in the axial direction or gradually increases. The upper width of the coil support portion 62 is smaller than the lower width. The coil support portion 62 has a tapered shape toward the upper side.

The coil support portion 62 has the rib 66 extending in a direction crossing the axial direction. In the present example embodiment, the protuberance 62a has ribs extending from the both ends of the protuberance 62a in the circumferential direction, and ribs extending from the both ends of each through hole 65 in the radial direction. Therefore, each protuberance 62a has six ribs 66. The width of the rib 66 is equal to or gradually smaller than the width of the heat sink through hole 110 from the lower side toward the upper side in the axial direction, and the width of the upper end is smaller than the width of the lower end. For this reason, the shape of the coil support portion 62 having the rib 66 of the present example embodiment is tapered axially upward. The protuberance 62a also has a tapered shape axially upward.

As shown in FIG. 6, the base portion 61 is fitted to the stator 50 via a gap. The base portion 61 and the stator 50 may be partially in contact with each other, but are preferably disposed with a gap in a direction perpendicular to the axial direction (including the radial direction and the circumferential direction). In the latter case, the entire coil support member 60 is movable with respect to the stator 50 when the motor 1 is assembled. In the present example embodiment, the base portion 61 and the stator 50 are disposed with a gap therebetween in the circumferential direction.

The base portion 61 has a coil support member fitting portion 67 that is a recess or a projection extending in the axial direction. The stator fitting portion and the coil support member fitting portion 67 are fitted through a gap by the recess and the projection.

The radial width of the recess of the stator fitting portion or the coil support member fitting portion 67 is larger than the radial width of the projection of the coil support member fitting portion 67 or the stator fitting portion. The circumferential width of the recess of the stator fitting portion or the coil support member fitting portion 67 is larger than the circumferential width of the projection of the coil support member fitting portion 67 or the stator fitting portion. Further, it is preferable that the stator fitting portion be a projection, and the coil support member fitting portion 67 be a recess, and they be fitted through a gap in the circumferential direction. In other words, the stator 50 has a projection extending in the axial direction, the base portion 61 has a recess extending in the axial direction, the projection of the stator 50 and the recess of the base portion 61 are fitted to each other with a gap in the circumferential direction, and the circumferential width of the recess of the base portion 61 is larger than the circumferential width of the projection of the stator 50.

In the present example embodiment, the coil support member fitting portion 67 is a recess formed in the base portion 61, and the stator fitting portion is the bus bar projection 57 formed on the bus bar holding member 54.

As described above, the stator 50 and the coil support member 60 are fitted in a projection-recess shape, whereby the coil support member 60 is positioned at a predetermined position. Further, they are fitted through the gap, so that the position of the coil support member 60 can be adjusted for the width of the gap. As a result, the heat sink 100 can be inserted while adjusting the position of the coil support member 60, which facilitates assembly. Further, the projection-recess relationship may be reversed so as to satisfy the functions described above.

Note that the bus bar holding member 54 as part of the stator 50 needs to be fixed because the bus bar and the coil lead wire need to be fixed by welding. On the other hand, the coil support member 60 may move as long as the coil lead wire can be positioned.

The coil support member fitting portion 67 is located between the adjacent coil support portions 62 in the base portion 61. In other words, the coil support member fitting portion 67 is located between the adjacent protuberances 62a in the base portion 61. The coil support member fitting portion 67 is located on the axially lower face of the base portion 61 and extends along the circumferential direction (parallel direction).

The control unit controls a motor main body having the rotor 40 and the stator 50, and as shown in FIG. 1, includes the board 70 and the electronic component 80 mounted on this board 70. The board 70 is disposed axially above the stator 50 so as to spread in the radial direction, and is fixed to the axially upper part of the heat sink 100. The electronic component 80 is mounted on at least one of the upper face and the lower face of the board 70.

As shown in FIG. 1, the heat sink 100 is disposed axially above the stator 50 and faces the board 70 in the axial direction.

The heat sink 100 has a function of absorbing heat from the electronic component 80 mounted on the board 70 and releasing heat to the outside, and is formed of a material having low thermal resistance. For example, the heat sink 100 is formed of a metal member such as aluminum.

Since the heat sink 100 holds the bearing 43, it is also used as a bearing holder. In the present example embodiment, since the bearing holder and the heat sink are integrated, the number of parts, the number of assembly points, and the costs associated therewith can be reduced. In addition, since heat resistance generated when the bearing holder and the heat sink are separated can be suppressed, heat can be easily transmitted to the outside.

Figure 7:
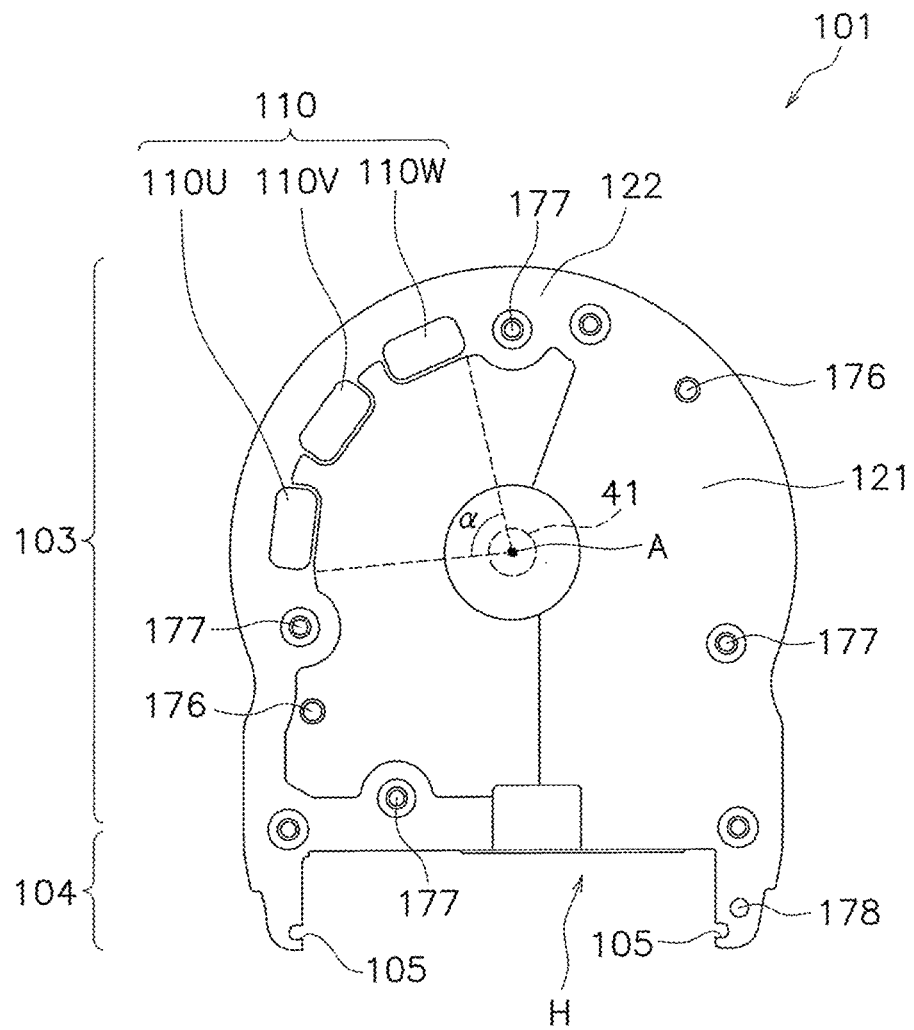
FIG. 7 is a plan view of a heat sink according to the first example embodiment of the present disclosure.
Figure 8:
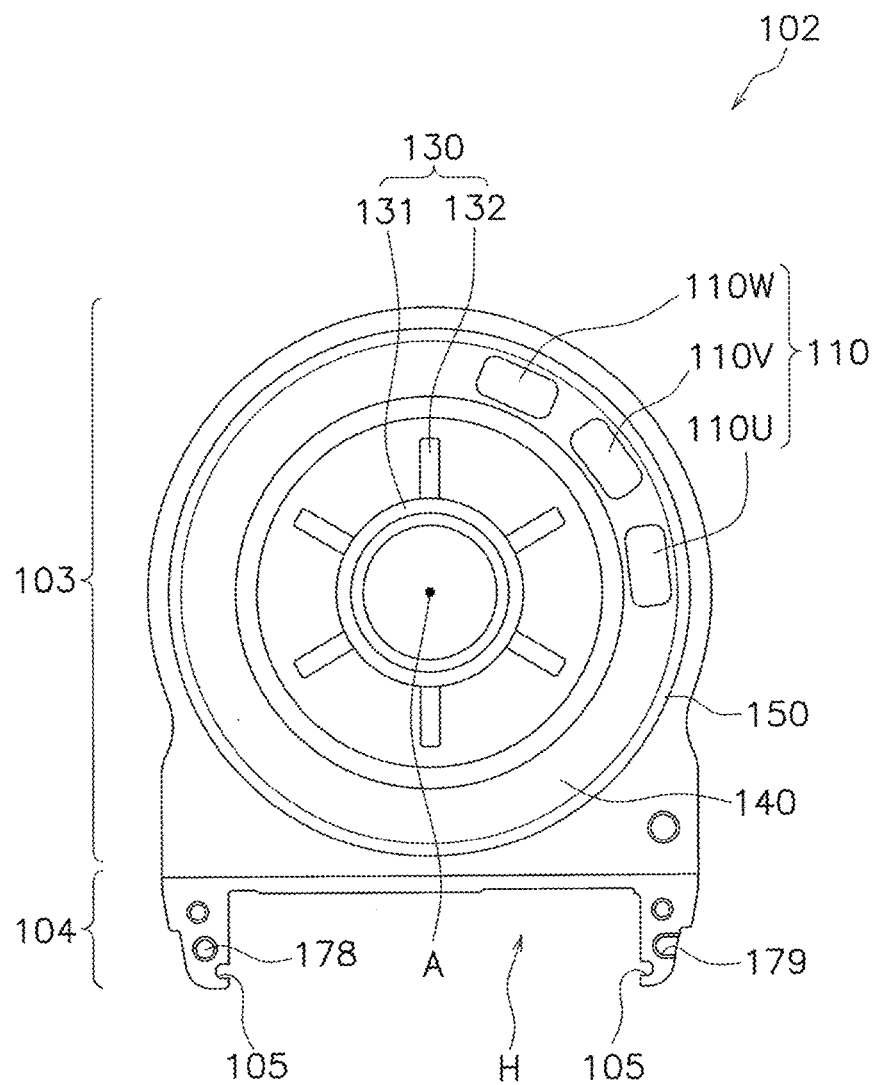
FIG. 8 is a bottom view of the heat sink according to the first example embodiment of the present disclosure.

The heat sink 100 has a heat sink upper face 101 shown in FIG. 7 and a heat sink lower face 102 shown in FIG. 8. The heat sink upper face 101 faces the board 70, and the heat sink lower face 102 faces the stator 50.

As shown in FIGS. 7 and 8, the heat sink 100 has a heat sink main body 103 and a heat sink protrusion 104 continuous with the heat sink main body 103 and extending radially outward of the housing 10.

The heat sink main body 103 overlaps the housing 10 that accommodates the rotor 40 and the stator 50 when viewed from the axially upper side. The heat sink protrusion 104 protrudes from the heat sink main body 103 in the radial direction, and covers at least part of the connector 200 in the longitudinal direction (the left-right direction in FIGS. 7 and 8).

A plurality of heat sink protrusions 104 shown in FIGS. 7 and 8 is formed at intervals. Specifically, the heat sink protrusions 104 protrudes from one end and the other end, of the radially outer end edge of the heat sink main body 103, toward the connector 200.

The heat sink protrusion 104 has a heat sink recess or a heat sink projection extending in the axial direction so as to be fitted to the connector 200 described later. The heat sink recess or the heat sink projection extends along the axial direction. In FIGS. 7 and 8, a heat sink recess 105 is formed on each of the inner faces of the heat sink protrusion 104 located at one end and the other end of the connector 200 in the longitudinal direction. The inner face of the heat sink protrusion 104 is a face facing the connector 200.

In the present example embodiment, the heat sink protrusion 104 is the exposed face 122 (see FIG. 1). That is, a clearance is provided between the heat sink protrusion 104 and the board 70. Therefore, it is possible to visually check whether a connector pin 81 is connected to the board 70 from the longitudinal direction of the connector 200 in the previous process of attaching the cover 30.

The heat sink 100 has a hollow portion H through which the conductive member passes and that extends in the axial direction. The hollow portion H is a through hole, a cutout or the like.

When the conductive member is the connector pin 81 or the like, in the structure shown in FIGS. 7 and 8, the hollow portion H through which the conductive member passes is formed of the heat sink main body 103 and the two heat sink protrusions 104. Specifically, the hollow portion H is formed of the radially outer end edge, of the heat sink main body 103, toward the connector and the two heat sink protrusions 104.

When the conductive member is a coil wire from the stator 50, as shown in FIGS. 7 and 8, the heat sink through hole 110 through which the coil wire passes and that extends in the axial direction is formed as the hollow portion H.

In this way, the hollow portion H of the heat sink 100 shown in FIGS. 7 and 8 includes a hollow portion, for the conductive member from the connector, formed by the radially outer end face of the heat sink main body 103 and the inner end faces of the two heat sink protrusions 104, and the heat sink through hole 110 for the coil wire.

Figure 9:
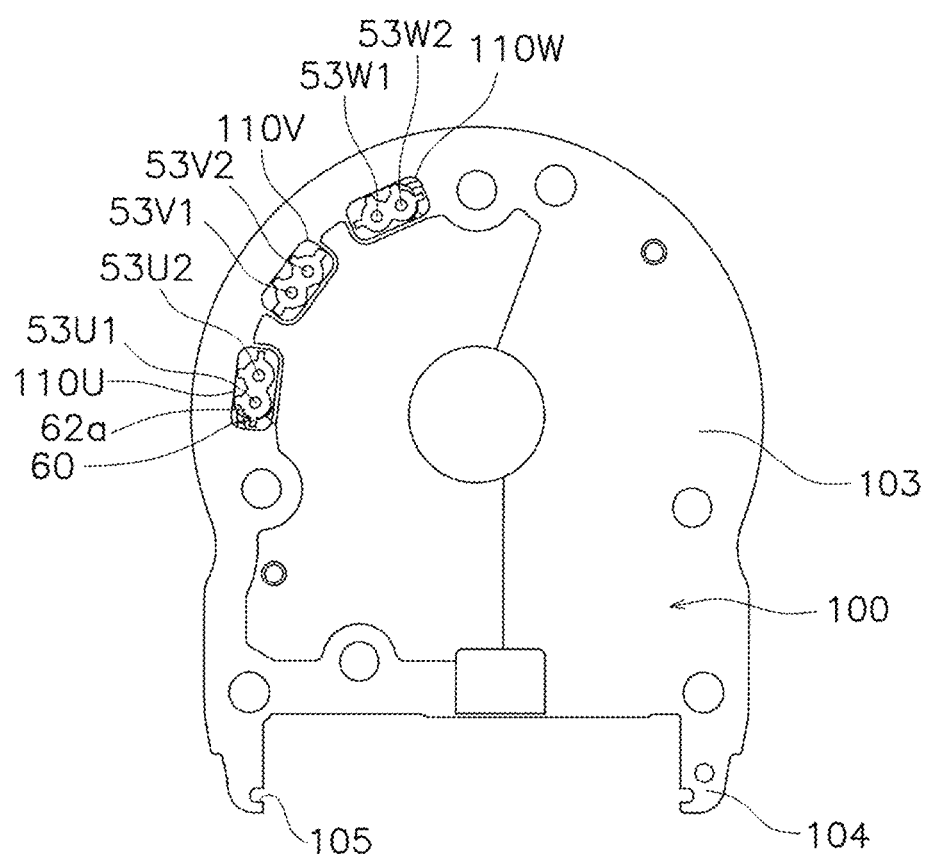
FIG. 9 is a plan view of the coil support member and the heat sink that support a coil wire according to the first example embodiment of the present disclosure.

As shown in FIGS. 7, 8, and 9, the heat sink through hole 110, through which a conductive member such as a coil wire passes, extends in the axial direction. For this reason, the heat sink through hole 110 can position the conductive member. As shown in FIGS. 1 and 9, the heat sink through hole 110 of the present example embodiment holds the coil support member 60 that supports the coil wire.

A plurality of the heat sink through holes 110 is located adjacent to each other in the circumferential direction. Specifically, a plurality of heat sink through holes 110U, 110V, and 110W is provided at intervals in the circumferential direction. That is, the plurality of heat sink through holes 110U, 110V, and 110W is aligned on a concentric arc at intervals.

As shown in FIG. 7, when the heat sink through holes 110U, 110V, and 110W are located in a region in which the central angle α centering on the shaft 41 (the center axis A) is within 180 degrees when viewed from the axially upper side. That is, the heat sink through holes 110U, 110V, and 110W are collected and disposed on one side. It is preferable that the number of slots be 6 or more, the number of phases be 3, and the central angle α be "(360 degrees/the number of slots)×3" degrees or less.

The term "phase" in the above formula is the number of independent coils of the fixed stator, and a three-phase motor with three phases is a motor with three independent coils at intervals of 120 degrees. In the present example embodiment, it is a three-phase motor of the U-phase, the V-phase and the W-phase. In addition, the term "slot" in the above formula represents the number of grooves between teeth, which is a multiple of 3 for the three-phase motor. In the present example embodiment, since the motor has 12 slots of 3 phases, the central angle α is preferably 90 degrees or less.

Similarly to the heat sink through holes 110U, 110V, and 110W, the coil lead wires 53U1, 53U2, 53V1, 53V2, 53W1, and 53W2 are desirably disposed so as to be located within the central angle α. By using the crossover wire 53a, the coil lead wire can be located within the central angle α.

As shown in FIG. 9, only a plurality of in-phase coil wires of the coil wires is inserted into each of the plurality of heat sink through holes 110U, 110V, and 110W. That is, one protuberance 62a of the coil support member 60 is held in each of the heat sink through holes 110U, 110V, and 110W. The plurality of heat sink through holes 110U, 110V, and 110W is holes separated from each other for each phase of the coil wire. That is, the plurality of heat sink through holes 110U, 110V, and 110W is independent from each other and are not connected. Specifically, only the lead wires 53U1 and 53U2, which are two the U-phase coils, are inserted into the heat sink through hole 110U. Only the lead wires 53V1 and 53V2, which are two V-phase coils, are inserted into the heat sink through hole 110V. Only the lead wires 53W1 and 53W2, which are two the W-phase coils, are inserted into the heat sink through hole 110W.

Figure 10:
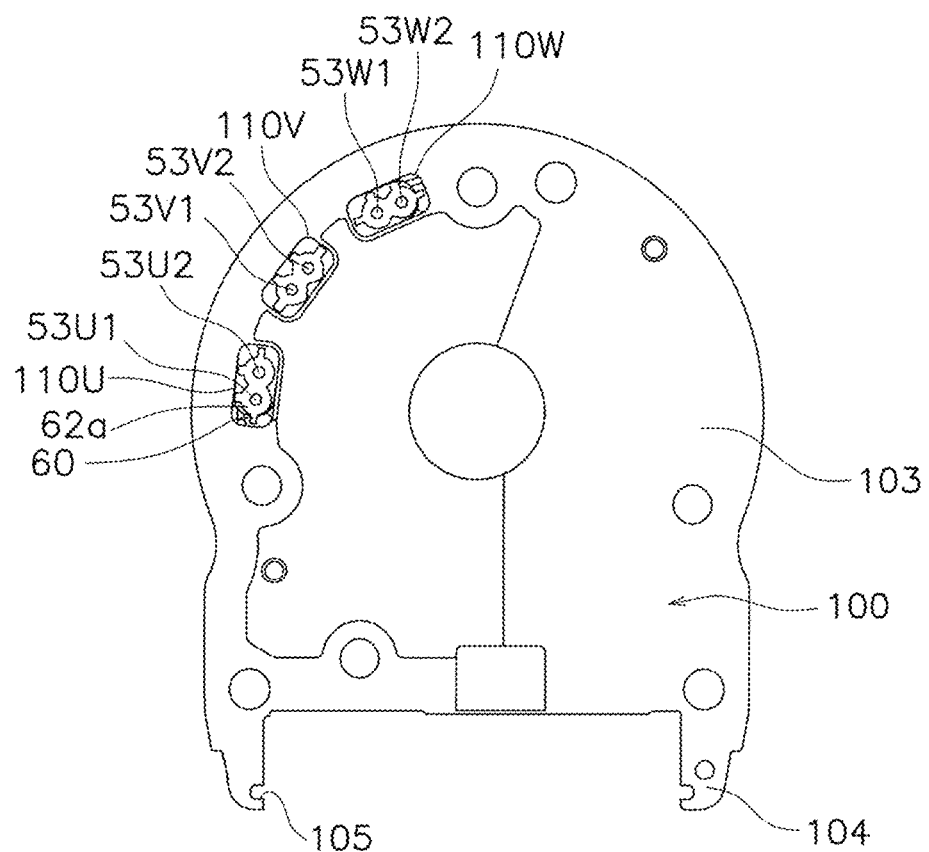
FIG. 10 is a plan view of a heat sink holding the coil support member according to the first example embodiment of the present disclosure.
Figure 11:
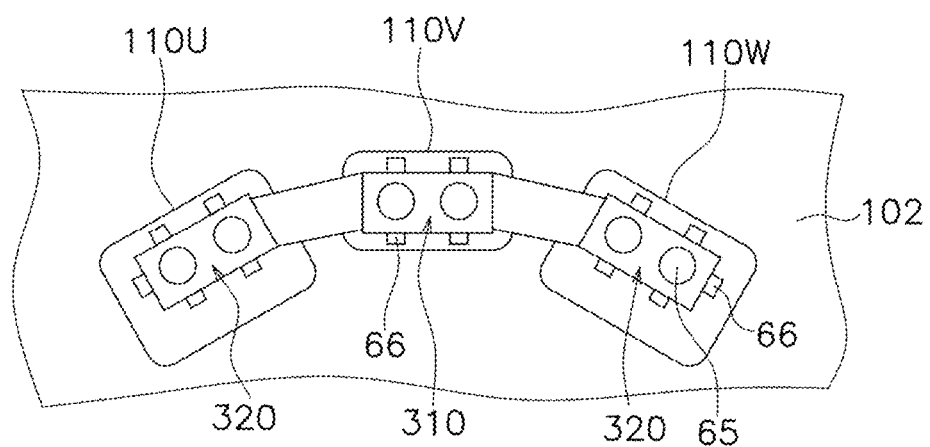
FIG. 11 is a bottom view of the heat sink holding the coil support member according to the first example embodiment of the present disclosure.

As shown in FIG. 9, at least part of the protuberance 62a of the coil support member 60 is located in each of the heat sink through holes 110U, 110V, and 110W. In detail, as shown in FIGS. 10 and 11, at least part of a first protuberance 310 is located in the heat sink through hole 110V located at the center in the circumferential direction of the heat sink through holes 110, and at least part of a second protuberance 320 is located in each of the heat sink through holes 110U and 110W located at both ends in the circumferential direction of the heat sink through holes 110.

At least part of each of the facing regions of the side face of the first protuberance 310 is close to the heat sink 100.

The term "close" means that the distance between the heat sink 100 and the first protuberance 310 is less than 1 mm. That is, the term "close" means that the heat sink 100 and the first protuberance 310 are in contact with each other, and the distance between the heat sink 100 and the first protuberance 310 is more than 0 mm and less than 1 mm.

The term "facing regions" are side faces, of the first protuberance 310, facing each other, that is, the opposing side faces. There are two sets of facing regions shown in FIG. 10. One set of facing regions (first facing regions) is a region R1 located at one side of the side face in the radial direction and a region R2 located at the other side of the side face in the radial direction. Another set of facing regions (second facing regions) is a region R3 located at one side of the side face in the circumferential direction and a region R4 located at the other side of the side face in the circumferential direction.

One or both of the first facing regions R1 and R2 and the second facing regions R3 and R4 are close to the heat sink 100. In the present example embodiment, part of the first facing regions R1 and R2 and part of the second facing regions R3 and R4 are close to the heat sink 100. When at least part of each of the facing regions of the side face of the first protuberance 310 is close to the heat sink 100, the first protuberance 310 is positioned in the heat sink through hole 110V. Therefore, the coil support member 60 can be positioned with respect to the heat sink 100.

In FIG. 10, the heat sink through hole 110V has a quadrangle shape when viewed from the axially upper side, when viewed from the axially upper side, the first protuberances 310 are close to the four sides of the heat sink 100. In addition, the ribs 66 that constitute the first protuberance 310 are close to the heat sink 100.

Further, when cut in a direction orthogonal to a direction in which the first protuberance 310 extends, the cross-sectional area of the first protuberance 310 located inside the heat sink through hole 110V is smaller than the cross-sectional area of the heat sink through hole 110V. The first protuberance 310 fits inside the heat sink through hole 110V. Therefore, the first protuberance 310 has a portion that is inserted into the heat sink 100. The first protuberance 310 may have a portion to be press-fitted.

On the other hand, the second protuberance 320 has a clearance with respect to the heat sink 100. The term "clearance" means that members are separated from each other by 1 mm or more so as not to contact each other. That is, the second protuberance 320 has a portion separated from the heat sink 100 by 1 mm or more. Part of the second protuberance 320 may be close to the heat sink 100. Of the second protuberances 320 located at both ends in the circumferential direction, the portion that has a clearance with respect to the heat sink 100 does not require high dimensional accuracy.

In FIGS. 10 and 11, two second protuberances 320 with the first protuberance 310 disposed therebetween in the circumferential direction, and heat sink 100 are close to each other at only one side in the radial direction. As a result, it is possible to perform positioning in the rotation direction with the first protuberance 310 as an axis. In FIG. 10, the ribs 66 on the radially outer side face of the second protuberance 320 are close to the heat sink 100, and the ribs 66 on circumferentially both end side faces and on the radially inner side face of the second protuberance 320 have a clearance with respect to the heat sink 100. For this reason, the coil support member 60 is attached to the heat sink through hole 110 not by press fitting but by insertion.

The number of locations where the second protuberance 320 and the heat sink 100 are close to each other is smaller than the number of locations where the first protuberance 310 and the heat sink are close to each other. In FIG. 10, the number of locations where the second protuberance 320 and the heat sink 100 are close to each other is two, and the number of locations where the first protuberance 310 and the heat sink 100 are close to each other is six.

Further, in the present example embodiment, the area where the second protuberance 320 and the heat sink 100 which are close to each other face each other is smaller than the area where the first protuberance 320 and the heat sink 100 which are close to each other face each other.

In this example embodiment, the first protuberance 310 and the second protuberance 320 have the similar shape. For this reason, the heat sink through hole 110V inside which the first protuberance 310 is located is smaller than the heat sink through holes 110U and 110W inside which the second protuberance 320 is located.

The first protuberance 310 and the second protuberance 320 have the similar shape, but may have different shapes. Further, the present disclosure is not limited to the structure in which the rib 66 of the first protuberance 310 is close to the heat sink 100, but the side face of the first protuberance 310 and the face forming the heat sink through hole 110V may be close to each other. Further, the ribs protrudes from the face forming the heat sink through hole 110V, so that the rib of the heat sink and the first protuberance may be close to each other.

Further, the shape of the heat sink through hole 110 when viewed from the axially upper side is not particularly limited, and any shapes such as a circle or a polygon are adopted.

Further, the numbers of the first protuberances 310 and the second protuberances 320 are not particularly limited. The coil support member 60 includes at least one first protuberance 310, at least one second protuberance 320, and the base portion 61 that connects the first protuberance 310 and the second protuberance 320.

Figure 12:
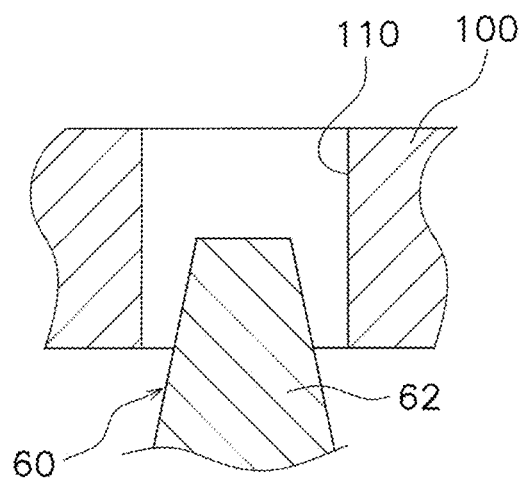
FIG. 12 is a cross-sectional view of a heat sink through hole and the coil support member according to the first example embodiment of the present disclosure.
Figure 13:
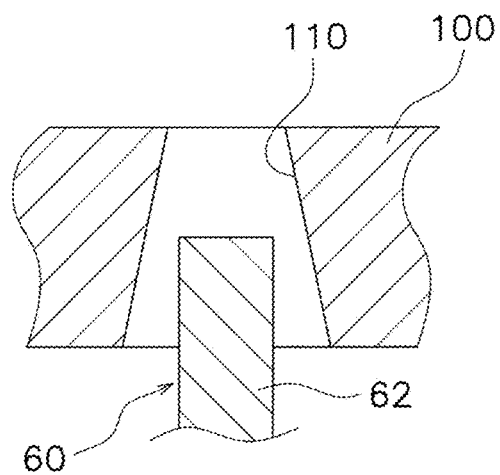
FIG. 13 shows a modification of FIG. 12.

As shown in FIG. 1, at least part of the coil support portion 62 is located in the heat sink through hole 110. As shown in FIGS. 1, 12, and 13, the gap between the coil support portion 62 and the heat sink through hole 110 is smaller or constant as it goes downward.

Specifically, as shown in FIG. 12, the width of the upper end of the coil support portion 62 is smaller than the width of the lower end of the heat sink through hole 110, and the width of the coil support portion 62 is constant or gradually larger as it goes from the upper side toward the lower side in the axial direction. More specifically, the heat sink through hole 110 has a constant width, and the coil support portion 62 has a side face which is tapered and which expands downward.

In addition, as shown in FIG. 13, the width of the lower end of the heat sink through hole 110 is larger than the width of the upper end of the coil support portion 62, and the width of the heat sink through hole 110 is constant or gradually smaller as it goes from the lower side toward the upper side in the axial direction. More specifically, the heat sink through hole 110 has a tapered shape that expands downward, and the coil support portion 62 has a side face with the constant width.

In FIGS. 12 and 13, although the width of the upper end of the heat sink through hole 110 is larger than the width of the coil support portion 62, the width of the upper end of the heat sink through hole 110 may be smaller than the width of the coil support portion 62.

In this way, since the clearance between the coil support portion 62 and the heat sink through hole 110 is constant or larger as it goes from the lower side to the upper side, when the motor is assembled, the heat sink through hole 110 can be easily inserted from above the coil support member 60.

Figure 14:
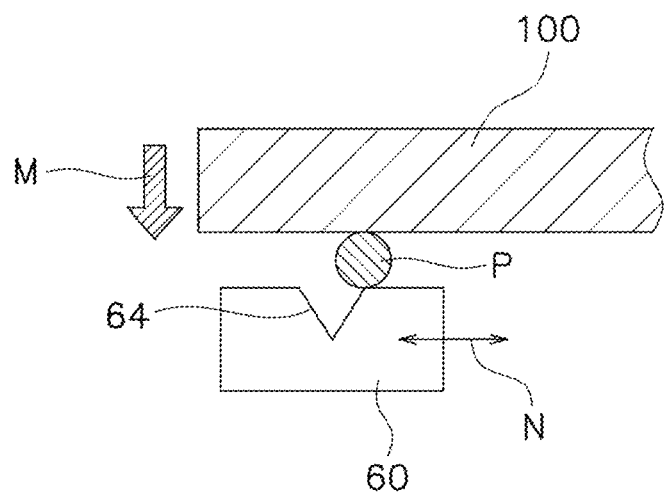
FIG. 14 is a schematic diagram of a process of inserting the heat sink into the coil support member from above in the first example embodiment of the present disclosure.

Also, as shown in FIG. 4, the groove 64 of the coil support member 60 allows easy positioning when the heat sink 100 is inserted from above the coil support member 60. The reason is as follows. As shown in FIG. 14, with a pin P inserted in the radial direction in the vicinity of the groove 64 on the upper end face of the base portion 61, when the heat sink 100 is inserted into the coil support member 60 from the upper side in the axial direction as indicated by arrow M, the heat sink 100 presses the pin P, so that the pin P moves to the groove 64. Since the coil support member 60 moves in accordance with arrow N in response to the pressing of the pin P, the heat sink 100 and the coil support member 60 can be positioned. The coil support portion 62 is inserted into the heat sink through hole 110, and the position is determined. Since the groove 64 is located axially above the upper end face of the housing 10, the inserted pin P can be easily removed.

As shown in FIG. 1, the heat sink 100 has a contact face 121 and the exposed face 122. The contact face 121 and the exposed face 122 are faces located on the upper face of the heat sink 100 shown in FIG. 7.

The contact face 121 comes into contact with the board or the electronic component 80 directly or through a heat dissipation member 123. The heat dissipation member 123 is a member having the heat dissipation performance such as grease. The heat dissipation member 123 comes into contact with the heat sink 100 and the board 70. The exposed face 122 is exposed without coming into contact with the board 70, the electronic component 80, and the heat dissipation member. In other words, the exposed face 122 is disposed with a gap from the board 70 or the electronic component 80. That is, the contact face 121 comes into direct or indirect contact with the board 70 or the electronic component 80, and the exposed face 122 comes into direct or indirect contact with no member.

As shown in FIG. 7, the exposed face 122 is located toward edge relative to the hollow portion H (the heat sink through hole 110 in FIG. 7). In the present example embodiment, since the plurality of heat sink through holes 110 is provided along the circumferential direction, the exposed face 122 is located radially outside of the heat sink through holes 110. The boundary between the contact face 121 and the exposed face 122 is located in the circumferential direction. In FIG. 7, the boundary between the contact face 121 and the exposed face 122 is positioned on a circular arc with a central angle α obtained by connecting the heat sink through hole 110U located at one end, the heat sink through hole 110W located at the other end, and the center axis A.

Since a gap is formed between the board 70 and the electronic component 80, and the heat sink 100 by the exposed face 122, the connection of the board 70 or the electronic component 80 and the conductive member can be visually checked.

Figure 15:
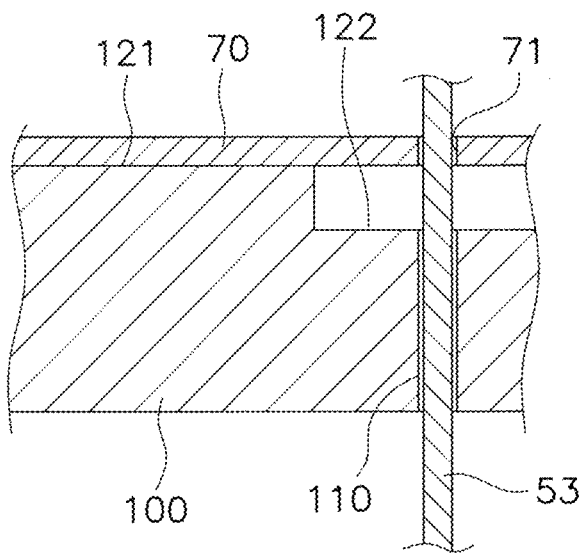
FIG. 15 is a schematic diagram of a heat sink and a board.
Figure 16:
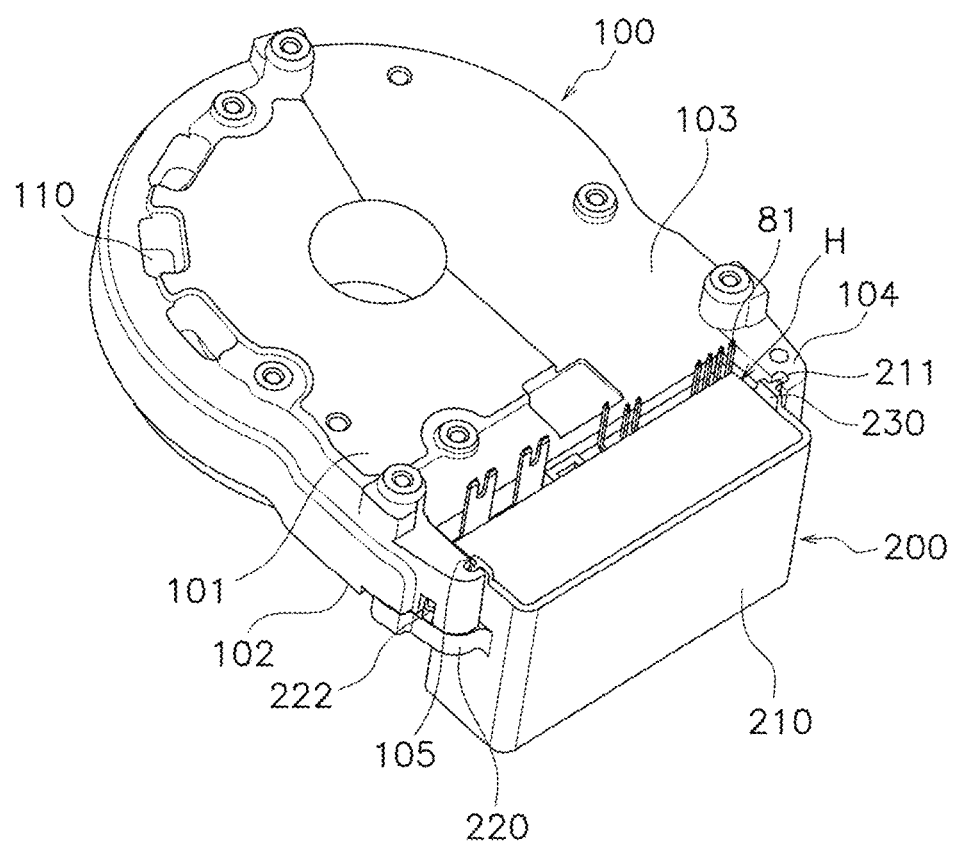
FIG. 16 is a perspective view of the heat sink and the connector according to the first example embodiment of the present disclosure.

In the heat sink 100 shown in FIG. 1, the exposed face 122 is located axially below the contact face 121. FIG. 15 schematically shows the relationship between the vicinity of the boundary between the exposed face 122 and the contact face 121, and the board 70. As shown in FIG. 15, the board 70 may have a plate shape that extends flatly, and the exposed face 122 may be located below the contact face 121.

The contact face 121 may have a first contact face that comes into direct contact with the board 70 or the electronic component 80, and a second contact face that comes into contact with the board 70 or the electronic component 80 via the heat dissipation member 123.

In order to check the shape of the lower end (back fillet) of the connection member that connects the electronic component 80 or the board 70 and the conductive member, it is preferable that the gap between the board 70 or the electronic component 80 and the exposed face 122 be larger than the gap between the board 70 or the electronic component 80 and the second contact face. In addition, the gap is thin due to the grease applied to the second contact face, and the connection member is disposed into the exposed face 122, so that it is difficult to see. From the viewpoint of suppressing such a problem, it is preferable to increase the gap between the board 70 or the electronic component 80 and the exposed face 122. In addition, when the coil support member 60 is displaced upward, it is difficult to see the lower end of the connection member, so that it is preferable to have a sufficient gap.

As shown in FIG. 1, when the distal end of the member that supports the conductive member (the coil support member 60 in the present example embodiment) is located at a height same as or below a height of the exposed face in the axial direction, the lower end of the connection member can be checked more easily. On the other hand, when the distal end of the member that supports the conductive member is located at a height same as or above a height of the exposed face 122 in the axial direction, it is possible to further prevent the connection member connecting the board 70 or the electronic component 80 and the conductive member from being conducted to the heat sink 100.

As shown in FIG. 1, the heat sink 100 includes an inner region 130, an outer region 140 located radially outside of the inner region 130, and an outer wall portion 150 formed radially outside of the outer region 140.

The inner region 130 at least partially overlaps the electronic component 80 in the axial direction. The axial thickness of the inner region 130 is larger than the axial thickness of the outer region 140.

In the present example embodiment, since the heat sink through holes 110U, 110V, and 110W are located in the radially outer region of the board 70, the board 70 is densely populated with the electronic components in the radially inner region thereof. Therefore, the heat of the electronic components can be released to the heat sink 100 by increasing the axial thickness of the inner region 130 of the heat sink 100. Furthermore, a space that accommodates the components can be secured by reducing the thickness of the outer region 140. Therefore, it is possible to more effectively dissipate heat from the electronic component and to suppress the axial dimensions.

As shown in FIG. 8, the inner region 130 has an inner wall portion 131 and a rib 132. The inner wall portion 131 and the rib 132 are formed on the heat sink lower face 102. The inner wall portion 131 extends axially downward at the radially inner end. The rib 132 extends radially outward from the inner wall portion 131. A plurality of ribs 132 is provided, and each of the plurality of ribs 132 is disposed at equal intervals in the circumferential direction. The plurality of ribs 132 extends radially in the radial direction with the center axis A as the center. Since the inner wall portion 131 and the rib 132 can increase the rigidity of the inner region 130 of the heat sink 100, the durability against the stress generating when supporting the shaft 41 can be improved when the heat sink 100 holds the bearing 43. Further, by extending the rib 132 in the radial direction, the heat capacity of the heat sink 100 can be increased and heat can be easily transferred radially outward.

The outer region 140 has the heat sink through holes 110U, 110V, and 110W through which the coil wire C described above is inserted. The lower face of the outer region 140 is located axially above the lower face of the inner region 130.

As shown in FIG. 1, the bus bar holding member 54 is located below the outer region 140 in the axial direction and overlaps the inner region 130 in the radial direction. In other words, a recess that is recessed in the axially upward is provided at the radially outer part and the lower face of the heat sink 100, and the bus bar B is accommodated in this recess.

In the present example embodiment, a large number of heat generating elements (elements having a relatively large amount of heat generation, such as FETs) are disposed in the center portion (radially inside) of the board 70. For this reason, the heat dissipation effect is enhanced by increasing the thickness of the inner region 130 located at the center of the heat sink 100 facing the board 70.

On the other hand, the coil wire C drawn from the coil 53 of the stator 50 is connected to the outer part (radially outer side) of the board 70, and no heat generating element is disposed. By disposing the bus bar holding member 54 while reducing the thickness of the outer region 140, the height in the axial direction can be suppressed. Further, the heat sink 100 covers the upper face and the side face of the bus bar, so that the heat sink 100 can absorb the radiant heat of the bus bar during driving.

The outer wall portion 150 surrounds the radially outer part of the bus bar holding member 54. The axial thickness of the outer wall portion 150 is larger than the axial thickness of the inner region 130. At least part of the outer wall portion 150 is exposed to the outside. Since the outer wall portion 150 includes a portion having the largest axial thickness in the heat sink 100, the heat dissipation effect can be further enhanced.

As shown in FIG. 7, the heat sink upper face 101 of the heat sink main body 103 has a second positioning recess 176 for positioning with the board 70. A plurality of the second positioning recesses 176 is formed as circular recesses. A positioning member such as a positioning pin is inserted into the second positioning recess 176 of the heat sink 100 and the positioning hole portion of the board 70 to perform positioning.

The heat sink main body 103 has a fixing hole 177 for fixing the board 70. The fixing hole 177 is a board contact portion that contacts the board 70 in the axial direction. A plurality of the fixing holes 177 is formed as circular holes. A fixing member such as a fixing pin or a screw is inserted into the fixing hole 177 of the heat sink 100 and the fixing hole 177 of the board to fix the board 70 and the heat sink 100.

The heat sink 100 and the board 70 are positioned using the positioning member, and are fixed by the fixing member. After the board 70 and the heat sink 100 are fixed, the positioning member is removed.

Since the heat sink 100 and the board 70 are brought into contact with each other, the fixing hole 177 protrudes axially upward with respect to the exposed face 122. That is, in the present example embodiment, the fixing hole 177 is located on the first contact face.

As shown in FIG. 7, the plurality of heat sink through holes 110 and the fixing holes 177 are provided at intervals in the circumferential direction. The two fixing holes 177 are provided at intervals in the circumferential direction with respect to the heat sink through holes 110U and 110W located at both ends in the circumferential direction among the plurality of heat sink through holes 110.

As mentioned above, in the present example embodiment, the structure in which the cover 30 and the connector 200 are fixed to the heat sink 100 is described as an example, but the motor of the present disclosure may have a structure in which the heat sink and the connector are fixed to the cover. In the latter case, an easily assembled structure can be realized by adopting a structure in which the heat sink and the connector are fitted via a gap.

In this example embodiment, the mechanically and electrically integrated motor in which the motor main body having a rotor and a stator, and the control unit that controls the motor main body are integrally disposed is described as an example, but the motor of the present disclosure is not limited to the mechanically and electrically integrated motor.

In this example embodiment, the holder that holds the bearing 43 and the coil support member 60 is the heat sink 100, but the holder of the present disclosure may be separate from the heat sink. The holder of the present disclosure may be separate from the bearing holder that holds the bearing.

In the present example embodiment, the support member through which the conductive member is inserted is the coil support member 60. However, the conductive member is not limited to the coil wire and may be a bus bar or the like. That is, the support member of the present disclosure is not limited to the coil support member.

Next, the effects of the first example embodiment will be described. The motor 1 according to the first example embodiment of the present disclosure includes the rotor 40 including the shaft 41 extending in an axial direction, the stator 50 surrounding a radially outer part of the rotor 40, the support member into which the conductive member is inserted, the support member being formed of an insulating material, and the holder having a plurality of through holes for holding the support member, in which the support member includes the first protuberance 310 and the second protuberance 320 at least part of which is located in the through hole, the first protuberance and the second protuberance being provided at intervals, and a base portion 61 connecting the first protuberance 310 and the second protuberance 320, and in which at least part of each of the facing regions of a side face of the first protuberance 310 is close to the holder, and the second protuberance 320 has a clearance with respect to the holder.

According to the motor 1 of the first example embodiment, since at least part of each of the facing regions of the side face of the first protuberance 310 is close to the holder, the first protuberance 310 in the through hole can be positioned by the adjacent portion. In this state, the second protuberance 320 has a clearance with respect to the holder. Therefore, of the second protuberance 320 and the holder, the dimensions of the regions that face each other with a clearance therebetween do not require high accuracy. For this reason, it is possible to reduce the number of portions, of the second protuberance 320, with which dimensional control is performed with high accuracy. Therefore, dimensional control can be easily performed on the support member and the holder.

In the motor 1 of the first example embodiment, preferably, the through hole has a quadrangle shape when viewed from an axially upper side, and the first protuberance 310 is close to four sides of the holder when viewed from the axially upper side.

The first protuberance 310 can restrict the movement of the support member in two intersecting directions (vertical direction and horizontal direction in FIG. 10).

In the motor 1 of the first example embodiment, preferably, the two second protuberances 320 are disposed with the first protuberance 310 interposed therebetween in a circumferential direction, and the two second protuberances 320 and the holder are close to each other at only one side in a radial direction.

The second protuberances 320 located at both ends are close to the holder at one side in the radial direction, so that the rotation of the support member can be restricted. In addition, the facing region where the other side of the second protuberance 320 in the radial direction and the holder face each other does not require dimensional control with high accuracy.

In the motor 1 of the first example embodiment, preferably, the first protuberance 310 includes a support portion having a support member through hole into which the conductive member is inserted, and the rib 66 extending in a direction intersecting a direction in which the support portion extends, and the rib 66 is close to the holder.

Dimensional control is easier by providing the ribs 66. Further, it is possible to suppress the occurrence of a contamination by inserting the first protuberance 310 into the through hole of the holder. Further, when the first protuberance 310 is formed of a material containing resin, it is preferable that the first protuberance 310 have the rib 66 in consideration of sink marks due to shrinkage of the resin.

In the motor 1 of the first example embodiment, preferably, the number of locations where the second protuberance 320 and the holder are close to each other is smaller than the number of locations where the first protuberance 310 and the holder are close to each other.

Since the number of locations where the first protuberance 310 is close to the holder is relatively large, the position of the first protuberance 310 is stable. Since the number of locations where the second protuberance 320 is close to the holder is relatively small, it is possible to reduce the number of locations where strict dimensional control is performed, and thus dimensional control is easier.

Preferably, the motor 1 of the first example embodiment further includes the bearings 43 and 44 located axially above the stator 50, the bearings supporting the shaft 41, and the holder is a holder that holds the bearings 43 and 44.

The holder has a function of holding the bearings 43 and 44 and a function of holding the support member. Therefore, the members can be omitted, and the motor 1 can be downsized.

Preferably, the motor 1 of the first example embodiment further includes the housing 10 that accommodates the rotor 40 and the stator 50 therein, and the support member is accommodated inside the housing 10.

With this configuration, it is possible to prevent the support member from coming off during use.

In the motor 1 of the first example embodiment, preferably, when cut in a direction orthogonal to a direction in which the first protuberance 310 extends, a cross-sectional area of the first protuberance 310 located in the through hole is smaller than a cross-sectional area of the through hole.

Since a gap is provided between the entire outer surface of the first protuberance 310 and the holder, the support member can be attached to the through hole of the holder by insertion. Therefore, it is possible to suppress the occurrence of a contamination.

In the motor 1 according to the first example embodiment, preferably, the stator 50 includes the coil 53 formed by winding the coil wire C, the conductive member is the coil wire C, the base portion 61 is disposed on an upper face of the stator 50, the first protuberance 310 and the second protuberance 320 extend axially upward from the base portion 61, and the base portion 61 and the stator 50 contact at least partially each other in the axial direction.

Since the base portion 61 and the stator 50 are in contact with each other in the axial direction, it is possible to attach the support member to the holder after placing the base portion 61 on the stator 50, and attaching the support member to the stator 50. Therefore, it is possible to prevent the support member holding the coil wire C from being deformed.

In the motor 1 of the first example embodiment, preferably, the stator 50 includes a stator fitting portion that is a projection or a recess that extends in the axial direction, the base portion 61 includes a support member fitting portion that is a recess or a projection extending in the axial direction, the stator fitting portion and the support member fitting portion are mutually fitted by the recess of the stator fitting portion and the projection of the support member fitting portion, or the projection of the stator fitting portion and the recess of the support member fitting portion with a gap, and a radial width of the recess of the stator fitting portion or the support member fitting portion is larger than a radial width of the projection of the support member fitting portion or the stator fitting portion.

Further, in the motor 1 of the first example embodiment, preferably, the stator 50 includes a stator fitting portion that is a projection or a recess that extends in the axial direction, the base portion 61 includes a support member fitting portion that is a recess or a projection extending in the axial direction, the stator fitting portion and the support member fitting portion are mutually fitted by the recess of the stator fitting portion and the projection of the support member fitting portion, or the projection of the stator fitting portion and the recess of the support member fitting portion with a gap, and a circumferential width of the recess of the stator fitting portion or the support member fitting portion is larger than a circumferential width of the projection of the support member fitting portion or the stator fitting portion.

According to these configurations, since it is possible to shift by the width of the recess of the stator fitting portion or the support member fitting portion when inserting the holder from the upper side in the axial direction, the position can be easily adjusted. Further, since the stator 50 and the support member are mutually fitted by the recess of the stator 50 and the projection of the support member, or the projection of the stator 50 and the recess of the support member, it is possible to prevent the shift amount of the support member from increasing. Therefore, it is possible to easily perform assembly while maintaining the positional accuracy.

Figure 17:
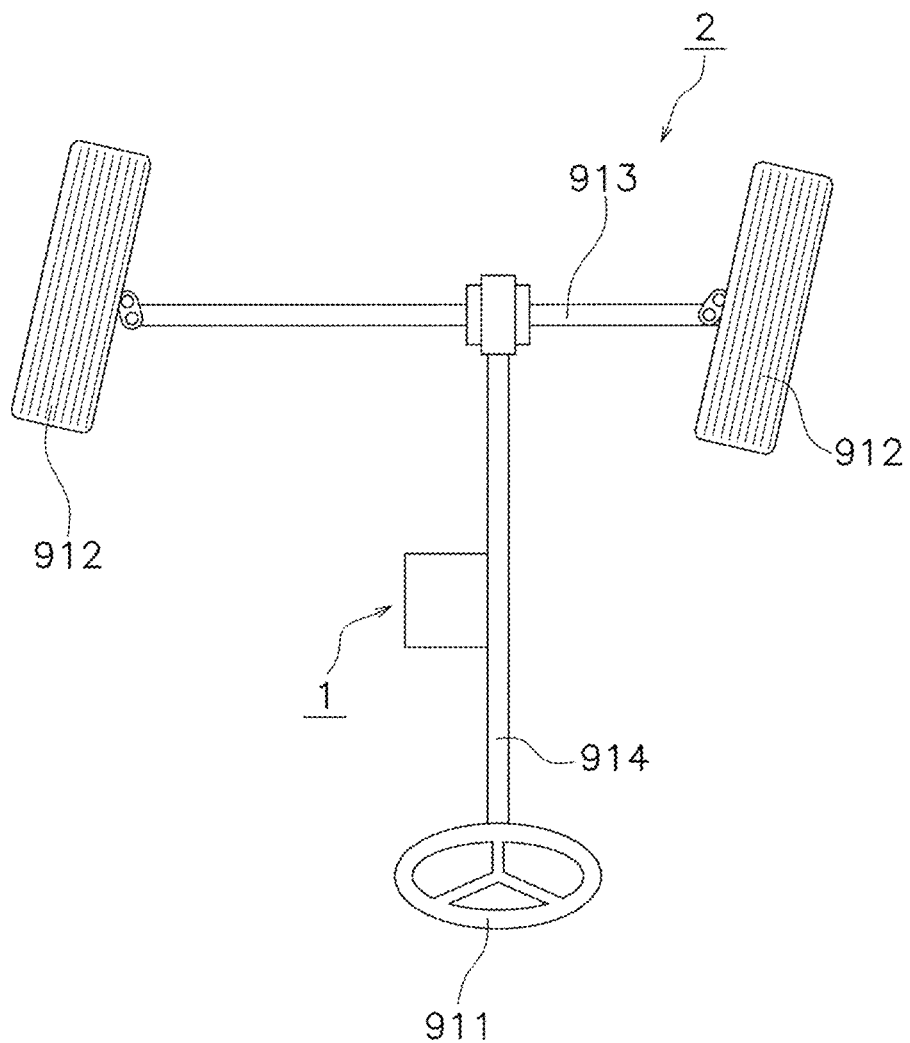
FIG. 17 is a schematic diagram of an electric power steering device according to a second example embodiment of the present disclosure.

With reference to FIG. 17, an example embodiment of an apparatus including the motor 1 of the first example embodiment will be described. In a second example embodiment, an example in which the motor 1 is mounted on an electric power steering device will be described.

An electric power steering device 2 is mounted on a steering mechanism for a vehicle wheel. The electric power steering device 2 of the present example embodiment is a column type power steering device that directly reduces the steering force by the power of the motor 1. The electric power steering device 2 includes the motor 1, a steering shaft 914, and an axle 913.

The steering shaft 914 transmits the input from a steering 911 to the axle 913 having wheels 912. The power of the motor 1 is transmitted to the axle 913 via a ball screw. The motor 1 employed in the column-type electric power steering device 2 is provided inside an engine room (not shown). In the case of the column-type power steering device, since a waterproof structure can be provided in the engine room itself, it is not necessary to provide a waterproof structure in the motor itself. On the other hand, although dust may enter the engine room, since the motor 1 has a dustproof structure, it is possible to suppress dust from entering the motor main body.

The electric power steering device 2 according to the second example embodiment includes the motor 1 according to the first example embodiment. For this reason, the electric power steering device 2 having the effect same as that of the first example embodiment can be obtained.

Here, although the electric power steering device 2 is given as an example of the usage method of the motor 1 of the first example embodiment, the method of using the motor 1 is not limited thereto, and it can be used for a wide range of devices such a pump and a compressor.

The example embodiments disclosed herein should be considered as an example in all points and not restrictive. The scope of the present disclosure is shown not by the example embodiments described above but by the claims, and it is intended that all modifications within the meaning and scope equivalent to the scope of the claims are included.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor including a shaft extending in an axial direction;
   a stator surrounding a radially outer portion of the rotor;
   a support into which a conductor is inserted, the support being made of an insulating material; and
   a holder including a plurality of through holes to hold the support; wherein
   the support includes a first protuberance and a second protuberance at least a portion of which is located in the through hole, the first protuberance and the second protuberance being provided at intervals, and a base portion connecting the first protuberance and the second protuberance;
   at least a portion of each of facing regions of a side surface of the first protuberance is close to the holder, and the second protuberance has a clearance with respect to the holder;
   the stator includes a coil including a wound cod wire;
   the conductor is the coil wire;
   the base portion is disposed on an upper surface of the stator;
   the first protuberance and the second protuberance extend axially upward from the base portion;
   the base portion and the stator contact each other at least partially in the axial direction;
   the stator includes a stator fitting portion that includes a projection or a recess that extends in the axial direction;
   the base portion includes a support fitting portion that includes a recess or a projection extending in the axial direction;
   the stator fitting portion and the support fitting portion are mutually fitted by the recess of the stator fitting portion and the projection of the support fitting portion, or the projection of the stator fitting portion and the recess of the support fitting portion with a gap; and
   a radial width of the recess of the stator fitting portion or the support fitting portion is larger than a radial width of the projection of the support fitting portion or the stator fitting portion.

2. The motor according to claim 1, wherein
   the through hole has a quadrangle shape when viewed from an axially upper side; and
   the first protuberance is close to four sides of the holder when viewed from the axially upper side.

3. The motor according to claim 2, wherein
   two of the second protuberances are disposed with the first protuberance interposed therebetween in a circumferential direction; and
   two of the second protuberances and the holder are close to each other at one side in a radial direction.

4. The motor according to claim 1, wherein the first protuberance includes:
   a support portion including a support through hole into which the conductor is inserted; and
   a rib extending in a direction intersecting a direction in which the support portion extends; and
   the rib is close to the holder.

5. The motor according to claim 1, wherein a number of locations where the second protuberance and the holder are close to each other is smaller than a number of locations where the first protuberance and the holder are close to each other.

6. The motor according to claim 1, further comprising:
   a bearing located axially above the stator and supporting the shaft; wherein
   the holder holds the bearing.

7. The motor according to claim 1, further comprising:
   a housing that accommodates the rotor and the stator therein; wherein
   the support is accommodated inside the housing.

8. The motor according to claim 1, wherein when cut in a direction orthogonal to a direction in which the first protuberance extends, a cross-sectional area of the first protuberance located inside the through hole is smaller than a cross-sectional area of the through hole.

9. The motor according to claim 1, wherein
   the stator includes a stator fitting portion that includes a projection or a recess that extends in the axial direction;
   the base portion includes a support fitting portion that includes a recess or a projection extending in the axial direction;
   the stator fitting portion and the support fitting portion are mutually fitted by the recess of the stator fitting portion and the projection of the support fitting portion, or the projection of the stator fitting portion and the recess of the support fitting portion with a gap; and
   a circumferential width of the recess of the stator fitting portion or the support fitting portion is larger than a circumferential width of the projection of the support fitting portion or the stator fitting portion.

10. An electric power steering device comprising the motor according to claim 1.

* * * * *